(12) United States Patent
McDermott et al.

(10) Patent No.: US 6,623,633 B2
(45) Date of Patent: Sep. 23, 2003

(54) SEWER ECO-COLLAR FOR SUMP APPLICATION

(76) Inventors: Holly Susan McDermott, P.O. Box 2311, Coppell, TX (US) 75019; Randy Scott McDermott, P.O. Box 2311, Coppell, TX (US) 75019

( * ) Notice: Subject to any disclaimer, the term of this patent is extended or adjusted under 35 U.S.C. 154(b) by 0 days.

(21) Appl. No.: 10/079,757

(22) Filed: Feb. 22, 2002

(65) Prior Publication Data

US 2002/0121466 A1 Sep. 5, 2002

Related U.S. Application Data

(63) Continuation-in-part of application No. 09/137,940, filed on Aug. 21, 1998, now Pat. No. 6,045,691, and a continuation-in-part of application No. 09/478,418, filed on Jan. 6, 2000, now abandoned.

(51) Int. Cl.[7] .................................................. E03F 5/06
(52) U.S. Cl. ........................................ 210/164; 210/282
(58) Field of Search ................................ 210/163–166, 210/264, 282

(56) References Cited

U.S. PATENT DOCUMENTS

| | | | | |
|---|---|---|---|---|
| 2,182,795 A | * | 12/1939 | Day .......................... | 210/164 |
| 2,783,852 A | * | 3/1957 | Sisk .......................... | 210/165 |
| 4,136,010 A | * | 1/1979 | Pilie et al. .................. | 210/164 |
| 4,776,722 A | * | 10/1988 | Gaudin ....................... | 404/25 |
| 5,720,574 A | * | 2/1998 | Barella ........................ | 405/52 |
| 5,958,226 A | * | 9/1999 | Fleischmann ............... | 210/165 |
| 6,045,691 A | * | 4/2000 | McDermott ................. | 210/164 |
| 6,093,314 A | * | 7/2000 | Wilson et al. ............... | 210/99 |
| 6,270,663 B1 | * | 8/2001 | Happel ....................... | 210/163 |
| 6,287,459 B1 | * | 9/2001 | Williamson ................. | 210/99 |

FOREIGN PATENT DOCUMENTS

JP          64-75743     *   3/1989

* cited by examiner

*Primary Examiner*—Fred G. Prince

(57) ABSTRACT

An apparatus for use in catch basin openings and being located on the inside peripheral edge of the storm sewer opening at or immediately below the point where storm water enters the catch basin opening. The apparatus includes a plurality of troughs located along the inside peripheral edge of the storm sewer opening. Each trough or trough section is located on the inside peripheral edge of the catch basin opening and discharges to one or more sumps or bags. The troughs are positioned at or below the elevation of the point where the storm water would normally discharge down into the storm sewer and diverts this storm water to the bag. The sump or bag rests upon the troughs of the support and flow diversion device by means of gravity with some form of handle or string to attach the device to said trough. An absorbent material is incorporated into the apparatus.

5 Claims, 12 Drawing Sheets

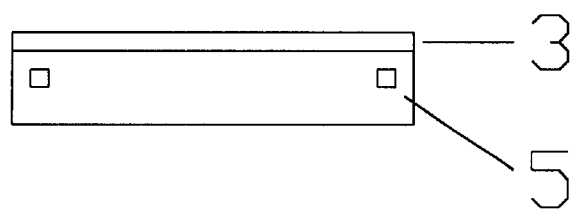
FIGURE 5
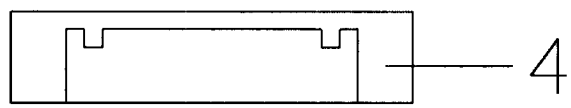 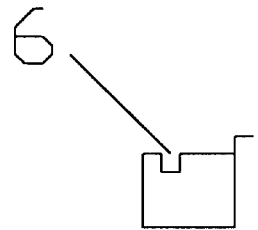
FIGURE 3       FIGURE 4

SEWER ECO-COLLAR FOR SUMP APPLICATION

CROSS REFERENCES TO RELATED APPLICATIONS

This is a continuation-in-part of application Ser. No. 09/137,940, filed Aug. 21, 1998 now U.S. Pat. No. 6,045, 691, and application Ser. No. 09/478,418, filed Jan. 6, 2000, now abandoned. Each of the said applications being incorporated herein by reference in its entirety.

STATEMENT AS TO RIGHTS TO INVENTION MADE UNDER FEDERALLY SPONSORED RESEARCH AND DEVELOPMENT

None

BACKGROUND OF THE INVENTION

1) Field of the Invention

This application is in the field of storm water pollution prevention and regulatory compliance with new storm water requirements. The application is specifically designed for a catch basin that has a bottom, walls rising from the bottom, a frames mounted on the walls for supporting a catch basin cover and a cover. The cover has a plurality of openings or a grate form to allow water to enter the catch basin and travel down to the bottom of the catch basin where piping exists to carry water to a natural drainage area such as a river or stream. These catch basins are customarily used for storm water drainage along roads and in parking lots. These catch basins come in many sizes and shapes; including circular, rectangular and square catch basins. The apparatus is specifically designed to accommodate the flow characteristics, space limitation, and variability of design associated with these catch basins with a specialized support and flow diversion device located inside the catch basin along the peripheral edge of the catch basin opening. The support and flow diversion device is a trough apparatus that directs the flow of water into at least one sump or bag. In most cases a plurality of sumps or bags will be employed along with a plurality of troughs, especially for rectangular and square catch basins where the preferred arrangement would be to have 2 troughs on opposing sides of the catch basin opening and 2 sumps or bags on the other opposing sides of the catch basin opening, such that troughs and sumps or bags would take up the entire peripheral edge of the catch basin and the sumps or bags would take up the space between the openings in the troughs. The openings from the trough leading into each sump or bag would preferentially be located on the wall of the trough, which is not adjacent to the catch basin frame and closest to the center of the catch basin opening. The openings in the trough being located towards the interior of the catch basin opening would be preferable since the flow of water and debris would be directed towards the sump, whereas an opening on the interior wall adjacent to the edges of the catch basin would cause additional turbulence and potential short-circuiting since the water would be directed towards a wall section. Each trough has at least two openings and although these openings could be at the ends as in McDermott (U.S. Pat. No. 6,045,691), it is envisioned that these openings would be on the wall nearest the center of the catch basin opening when bags are employed and either on the ends or the wall of the trough nearest the center of the catch basin opening when a rigid sump is used so as to avoid a conflict with the aforementioned patent by McDermott. The trough or plurality of troughs, as the case may be, would have a bottom and two sides defining the trough until there is a break in the trough by an opening in either the wall or bottom of the trough or simply an end to the trough section. The top of the trough would be open and unoccupied, except for the grate sitting above the trough and possibly some appurtenances associated with the apparatus, which could include a supporting member or a screen, either way the top of the trough would allow water to fall into the trough from above. The open and unobstructed trough would allow storm water and debris to enter the trough from the peripheral edge of the storm sewer system without being deflected or subject to increased turbulence by passing through fines screens or a perforated cover, although a small portion of the top of the trough could be obstructed by supported or miscellaneous hardware, the majority of the top of the trough would be unencumbered to allow unrestricted flow of water from the grate into the trough. The design of the top of the trough would be such that the majority of water and debris entering the catch basin from above the trough would fall into the trough and be directed towards a sump or bag. If the openings are in the wall of the trough located nearest the center of the catch basin then the ends would be unopened such that flow is directed towards the openings. The apparatus also allows for a supporting mechanism to hold the sump or bag, which makes up the treatment system. The support mechanism would be by direct attachment of the sump or bag to the support and flow diversion device in a manner that would mimic applicant's issued patent. A sump or a bag would extend from an opening in a trough to another opening in a trough. The sump or bag would be removeably supported by the trough system and allow for quick and easy maintenance. By removeably supported I am referring to an attachment of the sump or bag to the trough, whereby it can be readily removed from the trough apparatus. The trough apparatus is located on the inside peripheral edge of the storm sewer catch basin opening with the highest point of the support and flow diversion apparatus being at or below the point of entry of storm water into the catch basin opening. This will enable storm water to flow freely without encumbering storm water flow or the purpose of the storm sewer system. The preferred location is positioning the top of the trough at a fraction of an inch below the elevation of the point where the water begins to discharge down into the storm sewer to facilitate dumping and to ensure less turbulent flow to facilitate sedimentation and removal of liquid contaminants by the absorbent. The location of the sump or the bag would preferably be on the peripheral edge of the catch basin opening as well; however, it could also be away from the edge and bisecting the catch basin opening by extending from one side to another side. In any event the trough(s) and sump(s) or bag(s) would not take up the entire catch basin opening and leave a portion of the catch basin open and unoccupied. Furthermore, it would be required in the design that the inner wall of the trough nearest the center of the catch basin would not be continuous around the entire peripheral edge of said catch basin opening to allow a place for the sump to be installed. Therefore, the water entering into the apparatus would fall into both the sump and the trough from above and water and debris that entered the trough would be directed to a plurality of openings that discharge to a sump or bag or a plurality of sumps and bags. Furthermore, the entire peripheral area of the catch basin opening near the top of the catch basin would be occupied in a manner that would allow all or virtually all of the water entering the storm sewer to contact the trough or combination of trough(s), sump(s) or bag(s). If storm water flows are low or there is a spill of a contaminant, the apparatus can treat the entire flow and at high flows the apparatus would overflow allowing storm water to cascade over the unit into the unoccupied space within the catch basin opening and into the storm sewer system. This would allow the storm sewer system not to cause flooding while treating the critical initial flow of storm water.

The invention removes particulate matter as the primary treatment method through the use of a bag(s) or sumps with a secondary stage of treatment of dissolved and liquid phase storm water contaminants through the use of absorbent materials. The sump or bag can accommodate an absorbent material within the lining or through the placement of absorbent socks or pillows. These absorbents are generally oil only absorbents meaning that they repel water, but capture oils and greases. These absorbents are widely available commercially. Additionally an absorbent material can be used that is treated with special resins to retain other contaminants such as soaps and nitrates. The apparatus could also accommodate an absorbent sock within the troughs as with applicant's issued patent; however, the preferred embodiment would be incorporating the absorbent into the sump or bag. A rigid sump employed in this devise would allow for greater strength and less chance of a tear or failure. In each case the sump or bag would be permeable to water and have a large number of small openings to filter out material, while allowing water to pass. The top of the bag(s) or sump(s) would be open to facilitate both water discharging into the bag or sump or overflowing the bag or sump during excessive flows. Furthermore, this device is not limited to the strict use of only bags and only sumps and could accommodate any combination of bags or sumps. In fact a plurality of sumps or bags or combination thereof could accept storm water discharge from the same openings in the trough. One such embodiment of this apparatus is to discharge water through a trough into a permeable bag followed by either a sump or bag directly beneath the aforementioned permeable bag to provide a second stage of treatment. Alternatively, there could be a sump followed by either a bag or a sump beneath the aforementioned sump. In each case there are a number of openings in said bag or sump, including a number of openings at or near the bottom of said bag or sump to allow the sump or bag to filter the water and to allow the sump or bag to drain such that no or very little water is left stagnant in the sump or bag. By discharging the stagnant water no disease causing vectors, such as mosquitoes can breed.

The troughs would have a bottom at an elevation above the bottom of the sump or bag. The side walls of the trough would have a top at an elevation above the top of the sump or the bag. This arrangement would enhance flow from the trough to the sump or bag. The design of the trough would be such that the majority or all of the water and debris entering the trough during low flow would be directed to openings in the trough and discharge to a sump or bag. In fact the majority of the water entering the catch basin even at high flows would pass through the bag or sump. Furthermore, the openings in the trough that lead to the sump or bag would be sufficiently large to allow debris, such as sand and small gravel, to pass. Each hole leading to said sump or bag should be at least 0.5 square inch in area with a cumulative area of at least 4 square inches for all pathways to said sump or bag to ensure adequate flow of water and debris into the said sump(s) or bag(s). The preferred design of the openings being one opening near each end of the trough section taking out an entire section of the inner wall and extending at least 2 inches, such that the inner wall of the trough is not continuous around the opening of the catch basin and a preference for at least 2 sumps on the peripheral edge in the area unoccupied by the trough. This configuration will allow an absorbent sock to stick out of the openings in the trough such that the ends of the sock lead out into each sump. Therefore, there could be multiple holes or openings in the trough leading to the sump or one large opening leading to the sump. The majority or all of the trough, including walls and bottom, would be constructed of a material that would be impermeable or have a low permeability, to water, except for the places where openings exist. The permeability must be or should be less than 0.01 cm/sec through the trough walls or bottom, except where openings exist. Furthermore, the trough or troughs would be supported by a lip by either attaching to a flat bar frame that rest upon the catch basin frame used to support the cover or by having a lip as an integral part of the trough apparatus. The preferred method of support is to have a plurality of supports connected by a fastener such as a bolt and nut to a plurality of flat bar pieces to facilitate transportation, enhance on-site installation and to account for the minor variability in size and shape of catch basins through variability in design or manufacturing tolerances. The frame of the aparatus would support a plurality of troughs as is the case with McDermott (U.S. Pat. No. 6,045,691) or could be a lip on each trough that supports said trough onto the lip of the aforementioned frame of the catch basin such that both support and flow of water into the trough is enhanced.

The key feature of this apparatus is the preferential means of diverting water entering the peripheral edge into a treatment unit, while maintaining a portion of the catch basin open and unoccupied for discharge of storm water into the storm sewer system, such that both water and debris pass through large openings into the treatment unit, whether that treatment unit is a bag, sump, filter canister or whatever.

2) Description of the Prior Art

Storm water collection and conveyance systems are well known and in widespread use to provide flood control and proper drainage. Numerous inventions in the field of storm water sewers and pollution prevention have been patented over the last century that can modify storm sewer catch basins to prevent or reduce pollution from discharging out of the storm sewer or provide a support mechanism for environmental products to be held within storm sewer catch basins.

| U.S. Patent Documents | | | |
|---|---|---|---|
| 4,207,631 | 06/1980 | Baggey | 4/286 |
| 4,261,824 | 04/1981 | Cuschera | 210/164 |
| 4,606,820 | 08/1986 | Rea, et. Al. | 210/130 |
| 4,136,010 | 01/1979 | Pilie, et. al. | 210/164 |
| 4,261,823 | 04/1981 | Gallagher, et. al. | 210/164 |
| 4,174,183 | 11/1979 | Ferns | 210/164 |
| 4,188,151 | 02/1980 | Hall | 210/164 |
| 4,419,232 | 12/1983 | Arntyr, et. al. | 404/5 |
| 5,037,541 | 08/1991 | Ruey-Jang, et. al. | 210/165 |
| 5,133,619 | 07/1992 | Murfae, et. al. | 404/4 |
| 5,511,904 | 04/1996 | Van Egmond | 405/52 |
| 5,595,027 | 01/1997 | Vail | 52/12 |
| 5,632,889 | 05/1997 | Tharp | 210/165 |
| 5,720,574 | 02/1998 | Barella | 405/52 |
| 6,045,691 | 04/2000 | McDermott | 210/164 |
| 5,948,250 | 09/1999 | Middleton | 210/232 |
| 5,643,445 | 07/1997 | Billias, et. al. | 210/163 |
| 5,397,464 | 03/1995 | Hannon | 210/163 |
| 5,486,287 | 01/1996 | Murphy, et. al. | 210/164 |
| 3,713,539 | 01/1973 | Thompson, et. al. | 210/163 |
| 6,106,706 | 08/2000 | Roy, et. al. | 404/4 |
| 6,106,707 | 08/2000 | Morris, et. al. | 404/4 |

-continued

| | | | |
|---|---|---|---|
| 5,820,762 | 10/1998 | Bamer, et. al. | 404/4 |
| 6,086,758 | 07/2000 | Schilling, et. al. | 210/164 |
| 5,575,925 | 11/1996 | Logue, Jr. | 404/5 |
| 5,213,438 | 05/1993 | Barenwald | 404/2 |
| 5,223,154 | 06/1993 | MacPherson, Jr., et. al. | 405/36 |
| 5,480,254 | 01/1996 | Autry, et. al. | 404/2 |
| 5,632,888 | 05/1997 | Chinn, et. al. | 210/163 |
| 5,066,165 | 11/1991 | Wofford, et. al. | 404/4 |
| 5,958,226 | 09/1999 | Fleischmann. | 210/165 |
| | | Foreign Patent (Japan) | |
| 402210128-A | 08/1990 | Shima | E03F/5/10 |

Baggey (U.S. Pat. No. 4,207,631) cited a strainer within a drain noting prior art as early as 1901. This invention did not disclose the use of troughs or absorbents.

Cuschera (U.S. Pat. No. 4,261,824) cited two strainers within a floor drain. This invention did not disclose the use of troughs or absorbents.

Rea, et. al. (U.S. Pat. No. 4,606,820) developed and cites three prior U.S. Pat. Nos. 3,679,060, 3,757,956 and 3,768,654 that disclosed dual basket strainers. This invention did not employ a trough apparatus for flow diversion and is distinctly different than McDermott since no straining is performed in this invention's trough apparatus.

Therefore, we see that the use of strainers or sumps in a water drain; including multiple strainers, has been conceived decades ago and are now within the public domain. However, the key differentiating aspect of this invention is the unique method of flow diversion employed to convey water entering the catch basin into the sumps.

Pilie, et. al. (U.S. Pat. No. 4,136,010) developed a trough system to divert water to a treatment unit and did not disclose absorbents, sumps or bags in conjunction with a plurality of troughs.

Gallagher, et. al. (U.S. Pat. No. 4,261,823) developed a standpipe system with walls and did not disclose absorbents and bags in conjunction with the apparatus.

Ferns (U.S. Pat. No. 4,174,183) disclosed a support frame for highway furniture without consideration for pollution prevention. Ferns did not disclose either absorbents or bags in conjunction with the apparatus.

Hall (U.S. Pat. No. 4,188,151) disclosed a manhole extension for highway furniture without consideration for pollution prevention. Hall did not disclose either absorbents or bags in conjunction with the apparatus.

Arntyr, et. al. (U.S. Pat. No. 4,419,232) developed a two stage filtering and collection device for water drains. The first stage was a course strainer to remove wooden pegs and large objects, while the second stage was a fine mesh filtering bag, which had a primary purpose of removing finer particulate matter such as sand and having limited capabilities of filtering out oils and other liquids to a certain extent. Furthermore, the device is located at the center of the storm sewer opening thus obstructing flow and does not employ similar treatment technology.

The disadvantage with this design is that dissolved impurities are not removed and this filtration process ineffectively removes liquid phase impurities. Furthermore, what liquid phase impurities and finer particulate matter removed by the filtering bag would be re-suspended during high flow conditions and either flow into the storm sewer system or back up and flood the drainage area. In fact, high storm water flows and water pressures would likely tear or otherwise destroy the filter bag. This design would severely limit storm water flow rates.

Ruey-Jang, et. al. (U.S. Pat. No. 5,037,541) developed a filtering device to treat water by a series of plates with perforations and did not disclose absorbents and bags in conjunction with the apparatus.

Murfae, et. al. (U.S. Pat. No. 5,133,619) developed a filtering system to divert water through a basket containing a filtering media with a trough system to divert water out from the treatment unit and did not disclose absorbents and bags in conjunction with the apparatus.

Furthermore, this invention uses troughs to divert water into the treatment unit in a unique manner.

Van Egmond (U.S. Pat. No. 5,511,904) developed a funnel system to divert water to a treatment unit and did not disclose absorbents and bags in conjunction with the apparatus. Nor does he employ troughs with one or more openings, which is critical to this invention.

Vail (U.S. Pat. No. 5,595,027) developed a gutter system to divert water from roofing and did not disclose either absorbents or bags in conjunction with the apparatus.

Tharp (U.S. Pat. No. 5,632,889) developed a device, which sits on the peripheral edge of a manhole to hold a specific environmental product; an absorbent filter media, in which water filters down through a perforated bottom such that water contacts the absorbent and hydrocarbons are selectively removed.

This device does not have the option of removing fine particulate matter and requires a deep trough to ensure contact with the absorbent as the flow of the storm water is down through the absorbent.

Barella (U.S. Pat. No. 5,720,574) developed a device, which sits on the peripheral edge of a manhole to hold a specific environmental product; an absorbent filter media, in which water filters down through a perforated bottom such that water contacts the absorbent and hydrocarbons are selectively removed. The patent is specifically cited for catch basins with covers; however, the same patent number appears to be used for numerous modifications of this invention by the assignee, Kristar, in company advertisements and website including one such modification showing a pretreatment unit to remove solids prior to the Barella device without provisions for dumping or removal of this pretreatment unit and without the benefit of any troughs to direct flow into the storm sewer. Applicant has performed a diligent search for the patent number of this device and other modifications without success and concludes that these modifications were not patented at the time of the search. In either event applicants employ a trough followed by a sump, which is not disclosed in either patent or device and a preference for locating the trough and sump on the peripheral edge.

This Kristar device, as patented, does not have the option of removing fine particulate matter and requires a deep trough to ensure contact with the absorbent as the flow of the storm water is down through the absorbent. Flow into the unit is also arbitrary and without provision for flow diversion, hence certain portions of the device could become overloaded and wash away absorbent material. Furthermore, the modification of the patent noted above by adding a pretreatment unit for sedimentation by Kristar, fails to incorporate a flow diversion device, such as troughs to make flows more laminar and less turbulent. The Kristar modification utilizes a significant portion of the storm sewer opening thus limiting flows. Furthermore, the Kristar modification fails to employ a bag(s) or permeable sump and therefore this invention appears distinctly different from Kristar's modifications.

McDermott—(U.S. Pat. No. 6,045,691) developed a device specifically designed for catch basins with covers that uses the existing lip of the catch basin to support the apparatus between the lip and catch basin cover. A multiple trough system is used to support an absorbent sock as the first stage of treatment followed by a bag(s) hanging between successive troughs to catch particulate matter and allow for separation of lighter fraction that rises up to contact an absorbent sock held either in the trough or incorporated in a bag(s). This design for catch basins with covers were originally included in an application with a filing date of July, 1997; however, the application was abandoned and has been re-filed as this patent application. This patent application employs the same principles, but there are two distinct differences including employing a rigid sump or sumps and the preferred location of openings being along the interior wall of the trough rather than specifically at the open end. Although, this patent application captures the use of rigid sumps receiving water from open ends as well as from openings along the interior wall. Nonetheless, treatment methods, means of water conveyance using troughs and orientation of the unit on the peripheral edge are employed by both inventions.

Furthermore, a key design change for this invention is a modular assembly where trough units are bolted or otherwise secured to a frame to enhance transportation and assembly at the site. Therefore, this invention contains new matter not included in the McDermott patent.

Middleton (U.S. Pat. No. 5,948,250) developed a filtering berm system to treat water by a series of berm walls and a synthetic floor and did not disclose either absorbents, bags or sumps in conjunction with the apparatus.

Billias, et. al. (U.S. Pat. No. 5,643,445) developed a screening device to treat water by a strainer basket with perforations and did not disclose absorbents, bags or sumps in conjunction with the apparatus.

Hannon (U.S. Pat. No. 5,397,464) developed a filtering device to treat water by a strainer basket with perforations and did not disclose absorbents, bags and sumps in conjunction with the apparatus. Furthermore, the design was specific to a drain pipe rather than a catch basin.

Murphy, et. al. (U.S. Pat. No. 5,486,287) developed a filtering device to treat water by a strainer basket with perforations and did not disclose absorbents, bags and sumps in conjunction with the apparatus.

Thompson, et. al. (U.S. Pat. No. 3,713,539) developed a filtering device to treat water by a strainer basket with perforations and did disclose absorbents, bags or sumps in conjunction with the apparatus.

Roy, et. al. (U.S. Pat. No. 6,106,706) developed a filtering device to treat water by a perforated trough system with perforations in the bottom and sides and did not disclose absorbents, bags or sumps in conjunction with the apparatus.

Morris, et. al. (U.S. Pat. No. 6,106,707) developed a filtering device to treat water by a hopper with walls and perforations in a bottom plate and did not disclose either a trough system or bags in conjunction with the apparatus. The references to the hopper includes rigid walls and plates precluding a bag and do not disclose the unique flow diversion methods in conjunction with a bag used in this invention.

Bamer, et. al. developed a filtering device to treat water by a strainer basket with perforations and did not disclose either absorbents, bags or sumps in conjunction with a trough system.

Schilling, et. al. (U.S. Pat. No. 6,086,758) developed a filtering device to treat water by a strainer basket with perforations and did not disclose absorbents and bags specifically in conjunction with a trough system. The independent claim of Schilling's (U.S. Pat. No. 6,306,293) most recent patent does appear to conflict in part with the independent claim of McDermott (U.S. Pat. No. 6,045,691) by not specifying frame construction or bag location; however, it is apparent by the design that the intent was to occupy the entire opening of the catch basin. Furthermore, Schilling appears to employ a trough system for support based upon a review of the drawings. Since Schilling's original application was filed and granted after McDermott (U.S. Pat. No. 6,045,691) and potentially conflicts with the independent claim of McDermott, it can not be used to refuse patentability on this application. Furthermore, McDermott (U.S. Pat. No. 6,045,691) could be amended to include a basket and meet the independent claim of Schilling and was envisioned prior to applicants' knowledge of Schilling. The addition of a sump followed by a bag is noted herein.

Logue, Jr. (U.S. Pat. No. 5,575,925) developed a filtering device to treat water by a filter bag with perforations for catch basins with covers and did not disclose either absorbents or a trough system in conjunction with the apparatus.

Barenwald (U.S. Pat. No. 5,213,438) developed a safety trench drain with perforations and no means of pollution prevention and did not disclose absorbents, bags or sumps in conjunction with the apparatus.

MacPherson, Jr., et. al. (U.S. Pat. No. 5,223,154) developed a filtering device to treat water by means of employing plates and trays with perforations and did not disclose either absorbents or bags in conjunction with a trough system.

Autry, et. al (U.S. Pat. No. 5,480,254) developed a filtering device to treat water by a strainer basket with perforations and did not disclose absorbents and bags in conjunction with the apparatus.

Chinn, et. al. (U.S. Pat. No. 5,632,888) developed an environmental filter, which claims to remove solids by filtration by allowing water to run through a fabric type material over the catch basin opening. The aforementioned device is located centrally thus obstructing flow and does not employ similar treatment technology. Furthermore, the unit is located above the storm sewer opening and represents a slip, trip or fall hazard.

Wofford, et. al. (U.S. Pat. No. 5,066,165) developed a drain conveyance system without a means to treat water and did not disclose absorbents and bags in conjunction with a trough system.

Fleischmann (U.S. Pat. No. 5,958,226) developed a trough system with absorbent materials and discharge into a storm sewer with no provisions for bags or troughs diverting water for discharge to bags or sumps.

Shima (402210128-A) developed a drain system to prevent water intrusion within a building with no provision for pollution prevention and did not disclose the use of absorbent, bags or sumps in conjunction with the apparatus.

No prior inventions known to the inventor can treat the wide spectrum of storm water contaminants while ensuring that storm water drainage is maintained at the flows intended for in drainage designs with the exception of U.S. Patent by McDermott (U.S. Pat. No. 6,045,691) reference above. This invention is designed to employ both settling, filtration and absorbent technology by holding an absorbent material in a bag or sump. This invention is located only on the peripheral edge of the catch basin opening within the confines of the catch basin in a manner that allows an open and unobstructed portion of the storm sewer to act as an overflow and prevent flooding. A key component is the specialized support and flow diversion device for funneling storm water flows at the outside edges of the catch basin towards the sump(s) or bag(s), which to the best knowledge of the applicant is unavailable in any other invention with the exception of U.S. Patent by McDermott (U.S. Pat. No. 6,045,691) that incorporates troughs for funneling water to bags.

Furthermore, there are devices noted above (Tharp and Barella) that hold absorbents on the peripheral edge of the storm sewer, but employ a perforated bottom such that storm water flows through the device. While my invention has a plurality of troughs; generally two, that are impermeable to water and use the perimeter of the storm sewer to direct water to a bag or sump containing the absorbent material. Furthermore, absorbent material could be employed in the trough section as well in the form of an absorbent sock or pouch. Hence, the contact time with the absorbent material with this invention could be greater than that afforded from a device with a single trough and a perforated bottom that is much deeper. Another problem associated with Tharp and Barella is that the one trough system filled with absorbent limits the amount of water that can contact the absorbent material as the porosity of the absorbent material and size of the perforations in their device would severely restrict flow, whereas this invention having a plurality of troughs and openings can accommodate much higher flow rates through the troughs and much more water could contact the absorbent material.

This invention being located at the top of the catch basin opening near the peripheral edge alleviates a major problem associated with other designs which are set further inside or are deeper involving removal and replacement of absorbents, maintenance or cleaning. Ergonomics and safety considerations favor the apparatus being located inches from the surface on the peripheral edge alleviating the need for reaching as far down or over in this invention versus these other designs.

Neither the Tharp (U.S. Pat. No. 5,632,889), Barella (U.S. Pat. No. 5,720,574) nor Arntyr, et. al. (U.S. Pat. No. 4,419,232) is adaptable to holding a sump or bag on the outside edge of the storm sewer catch basin as the entire periphery of the catch basin is occupied by the apparatus nor capable of directing water to a sump or bag anywhere between the trough. Additionally, the placing of a bag on the outside edge or across a finite area of the catch basin opening reduces the stresses and forces on the sump or bag such that tearing or destruction of the sump or bag will not occur and water can flow freely through the unoccupied center portion. The bag or bags, if used in this invention would also be much lighter than the bag in the Arntyr invention as the openings are much smaller and the capacity of the bags could be much less than one bag extending over the entire opening.

Another unique feature of both this invention and U.S. Patent by McDermott (U.S. Pat. No. 6,045,691) is the diversion of storm water by a trough or troughs to a bag or rigid sump, which helps establish a more laminar and less turbulent flow. The preferred method of diverting the water to the sump or bag is through openings in the sides of the trough facing inwardly towards the center of the catch basin away from the sides.

Although an opening in the bottom of the trough would also be acceptable. The trough would be constructed of a material that is impermeable to water except for openings in the trough to direct water or attach a sump, a bag or a plurality of sumps or bags.

SUMMARY

It is the purpose of this apparatus to provide a mechanism within a catch basin to hold absorbent material and a sump(s) or bag(s) in such a way as to effectively remove storm water contaminants while permitting storm sewers to function as intended without impeding storm water flow into the storm sewer system. The apparatus utilize very simple principles to effectively treat storm water, while maintaining optimum flow rates in drainage systems. The structure is located on the inside peripheral edge of the storm sewer opening and designed to hold both absorbent material and a sump(s) or bag(s) which can remove dissolved and liquid phase contaminants.

Another purpose of the apparatus is to provide for flow diversion of storm water entering the edges of the catch basins towards a bag or sump. The use of troughs along the face of the opening that extends laterally along a wall of the catch basin to divert storm water to a sump(s) or bag(s) allows for optimal treatment by directing the storm water without excessive turbulence into the sump or bag. Hence there is less risk of short circuiting of flows and greater contact of storm water with the bag and absorbent material with the unique flow diversion system. The troughs directs storm water to the bag or sump in such a manner as the discharge of the storm water into the bag or sump has a velocity vector towards the center of the bag or sump, thereby using a very simple principal of physics to provide contact time with the absorbent and prevent short circuiting of flows into the bag or sump. If the storm water flows are the same from each side of the bag or sump there will be an immediate dampening effect on the flow velocity of the storm water by the effect of storm water flowing into one side of the storm sewer colliding with storm water flowing from the opposite side thereby reducing flow velocity and enhancing sedimentation.

Hence this apparatus has the purpose of removing a broad spectrum of dilute liquid and dissolved contaminants from storm water through the action of an absorbent material and collection of solid contaminants in a bag, a sump or plurality of bags and sumps while maintaining optimum drainage.

Applicant utilizes known inventions and techniques in the field of storm water pollution prevention; including the use of troughs connected to the peripheral edge, bags, and absorbent; which have been in use around storm sewer openings for decades. However, the use of these is unique to all other inventions due to the means of discharging water, including the location of openings and the interaction of the trough system with the sump or bag. The real innovation of this invention is the unique and preferential means to divert water and debris to one or more sumps, either rigid or flexible, by means of multiple large openings on the inner walls of the trough while the remaining portion of the inner wall, the bottom, outer wall and sides of the trough is resistance to allowing water and debris to pass.

BRIEF DESCRIPTION OF THE DRAWINGS

The features, discussions and claims of this apparatus will become apparent from the drawings and following description and discussion. In each of these drawing the Number 1 denotes a trough, Number 2 denotes a frame that connects to said trough, Number 3 denotes the lip on the trough, Number 4 denotes the opening in the trough leading to a sump of bag, Number 5 denotes an opening in a frame to bolt the frame to a trough, Number 6 denotes an opening in the trough for holding a bag or sump, Number 7 denotes a bag, Number 8 denotes a rigid sump and Number 9 denotes a ledge off the trough opening to the sump or bag.

FIGS. 1 & 2 show the point of attachment of the trough with the frame section in a nut and bolt type connection rather than a single welded type unit.

FIGS. 3, 4 and 5 are all views of a trough and represents the front, side and top views respectively.

FIG. 6 includes a sump and FIG. 7 shows no sump so that the trough apparatus can be viewed more clearly. This is not the preferred design since the apparatus does not employ a sump and trough arrangement such that the entire peripheral edge is occupied by both the sump and the trough. Both FIGS. 6 and 7 show small circles that depict a nut and bolt type attachment, which is preferable to a welded or one single-piece frame.

DESCRIPTION OF THE PREFERRED EMBODIMENTS

Figure 1:
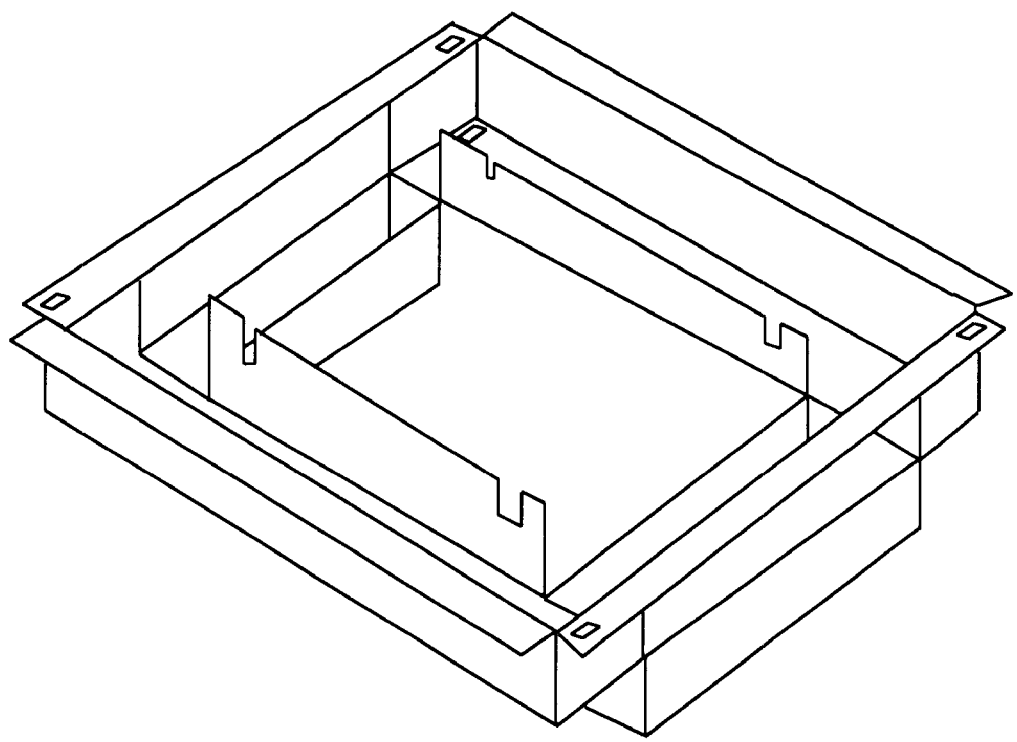
FIGS. 1 & 2 represents the unit comprising two troughs and two sumps oriented as if connected together in a rectangular catch basin. The method of attachment is shown along the inner walls of the trough, but attachment to other walls are allowable. Both
Figure 2:
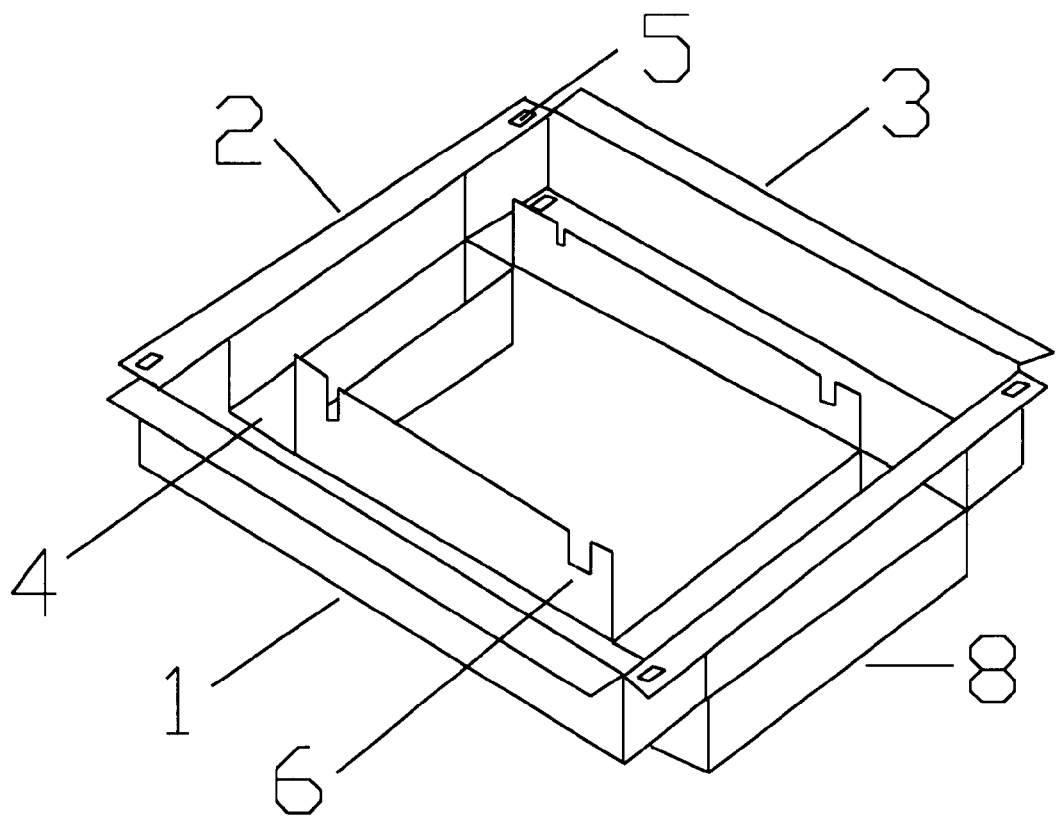
Figure 6:
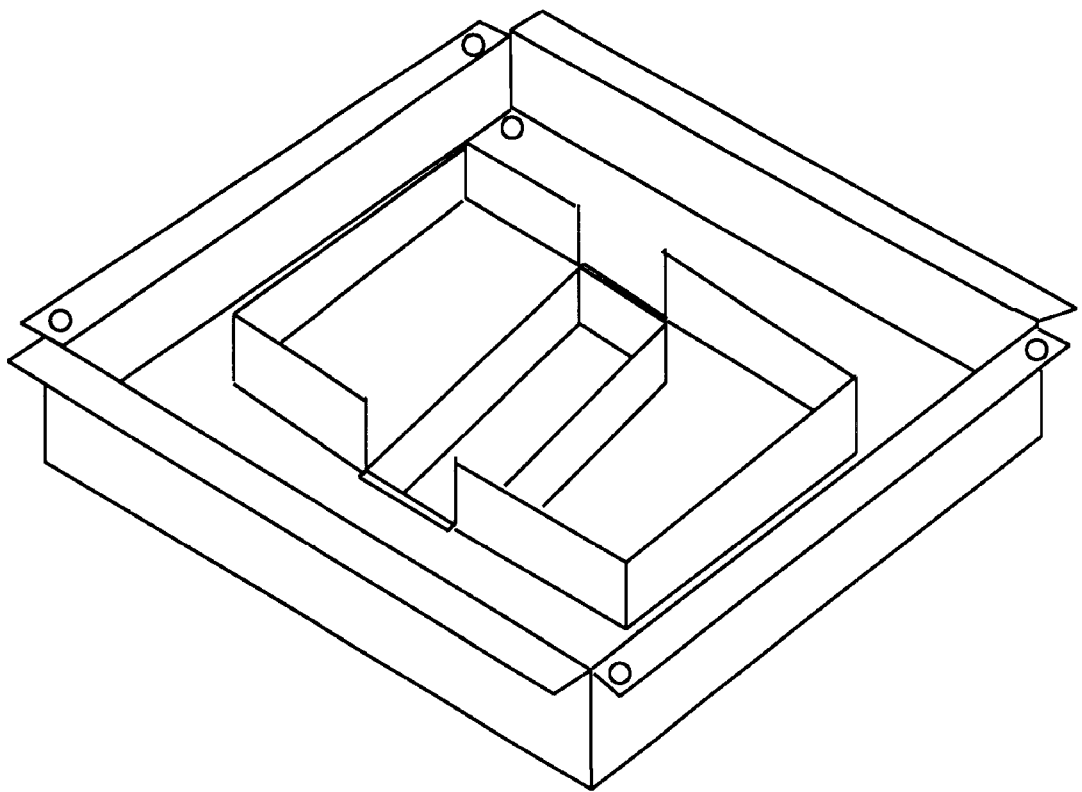
FIGS. 6 & 7 represents one trough with two large openings to discharge water and debris out to a treatment device.
Figure 7:
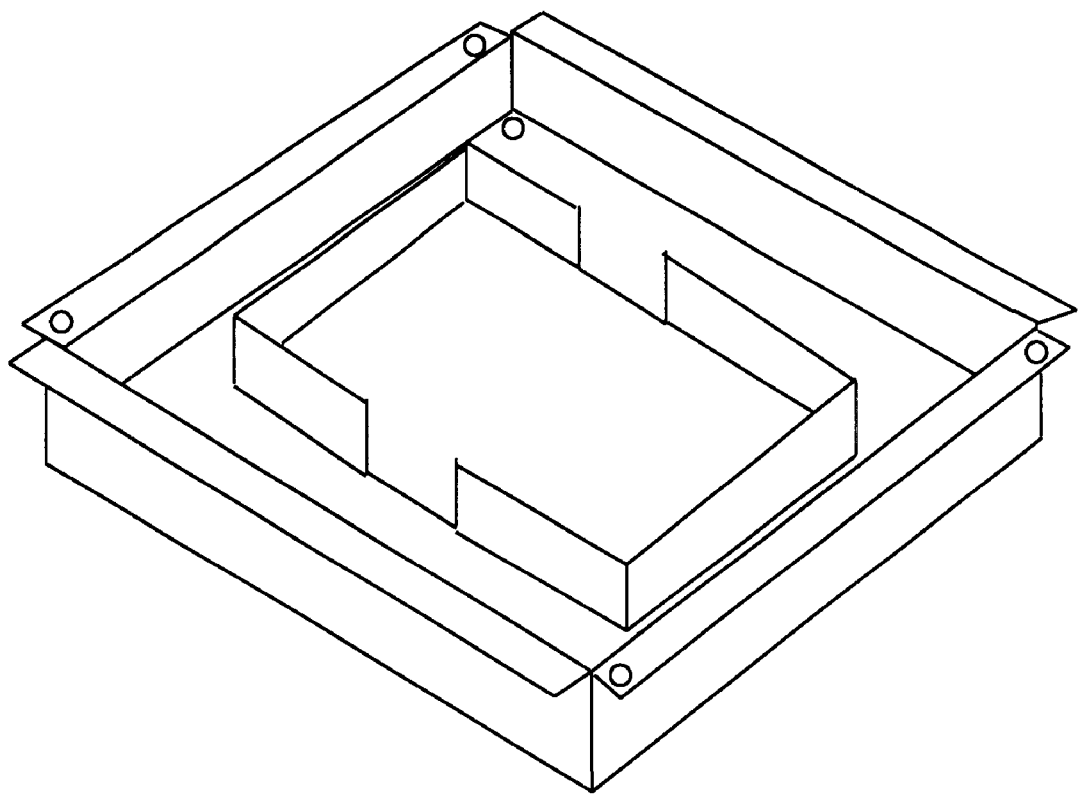
Figure 8:
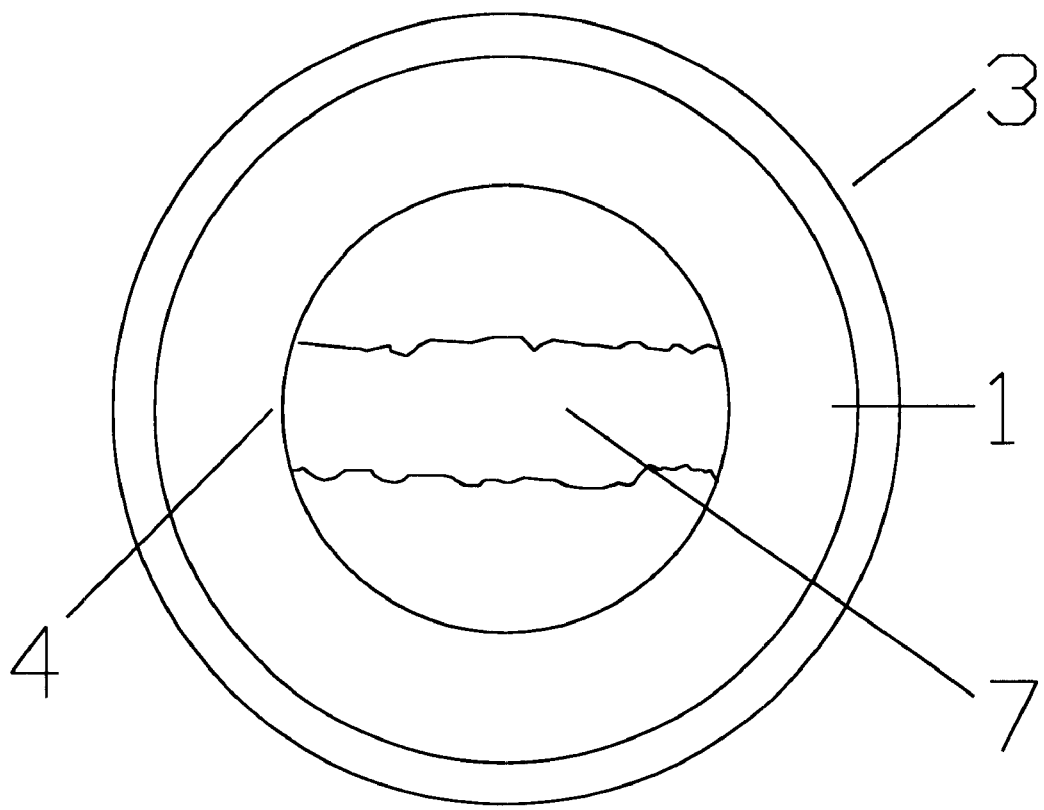
FIG. 8 depicts a circular catch basin insert with a bag extending from one side to another. The circular catch basin is the only design where a trough extending along the entire peripheral edge is practical.
Figure 9:
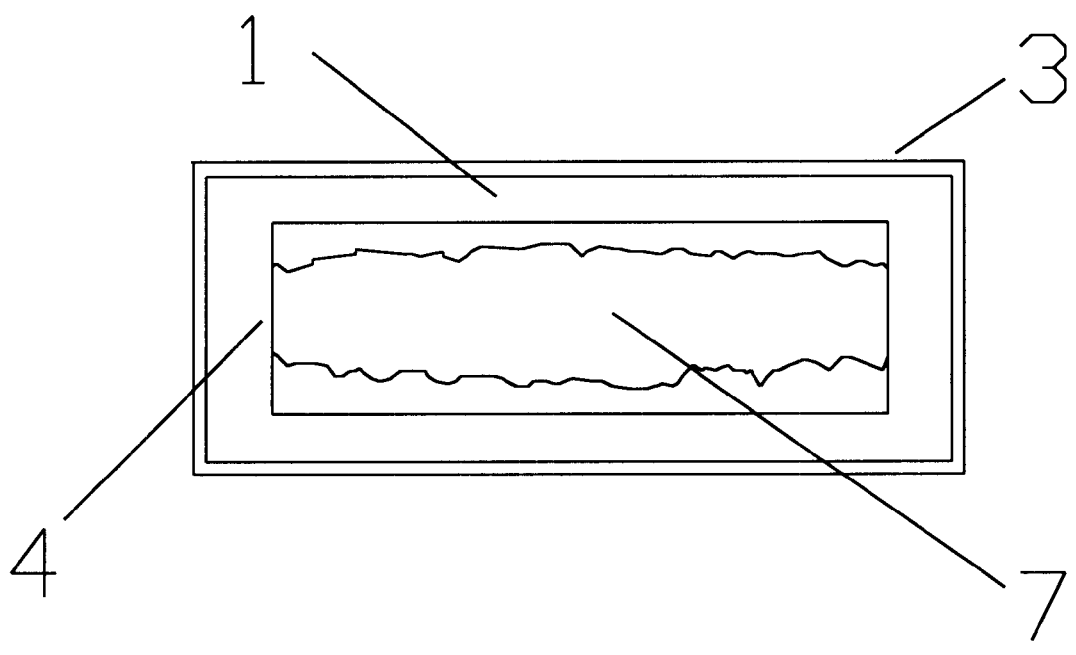
FIG. 9 depicts a rectangular catch basin insert with a bag extending from one side to another.
Figure 10:
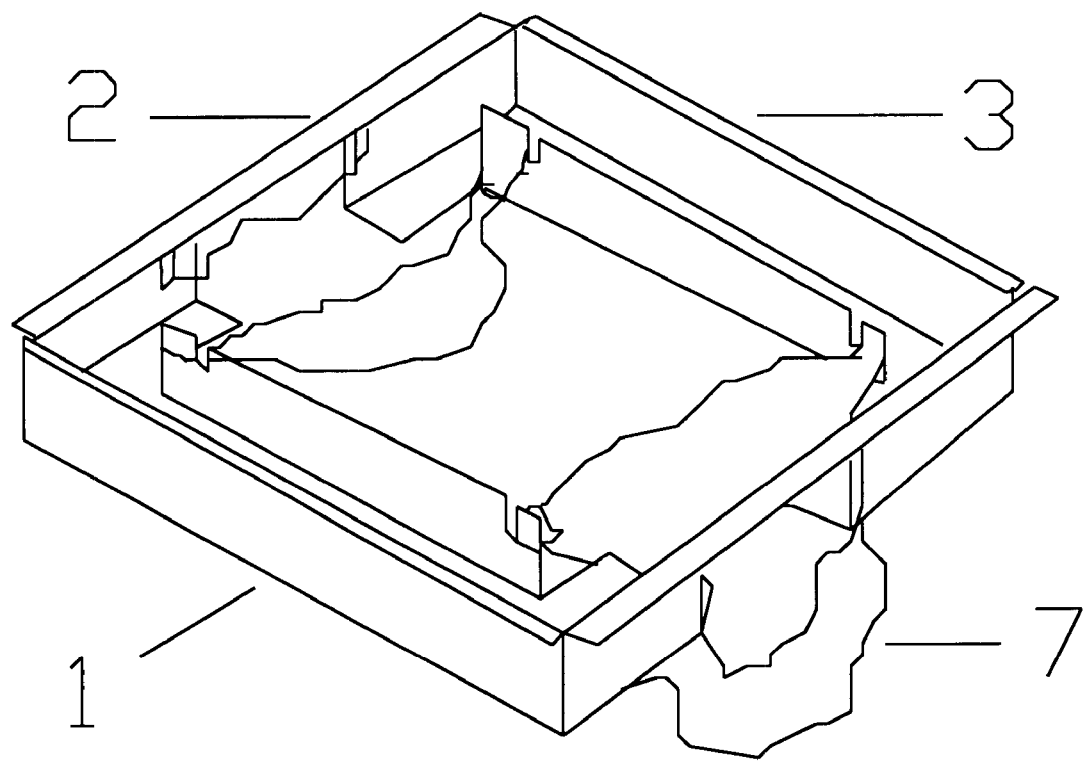
FIG. 10 depicts a rectangular system with a ledge off the trough opening to better direct the flow of water into a bag or sump, as well as a wing wall adjacent to the wall of the catch basin to better direct the flow of water into a bag or sump. The illustration shows how the bags are attached to the trough and the location along the peripheral edge.
Figure 11:
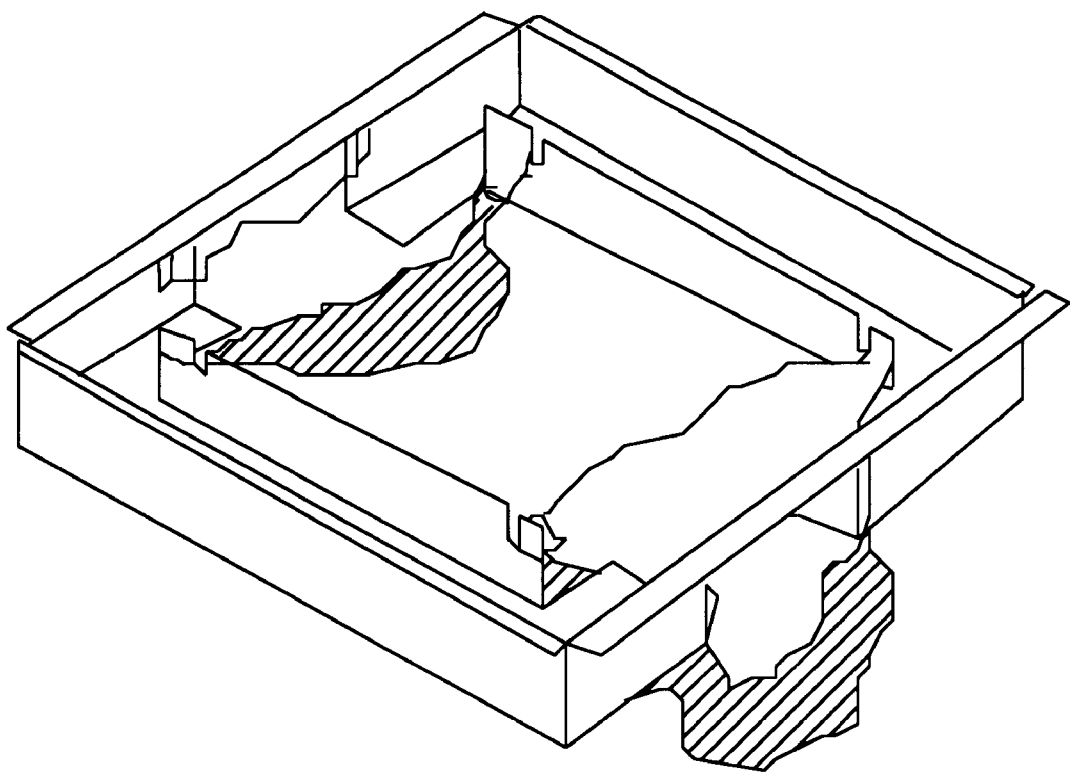
FIG. 11 is the same view as FIG. 10 with the exterior of the bag hatched and the interior not hatched.
Figure 12:
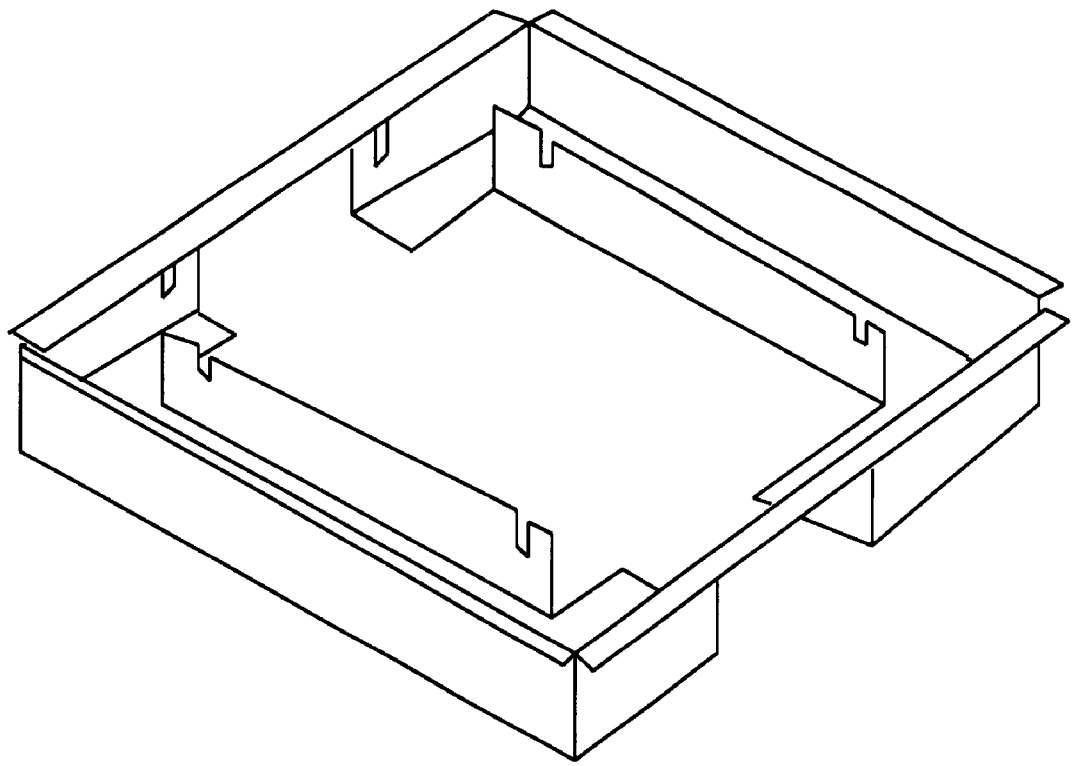
FIG. 12 is the same view as FIG. 10 without the bag or sump to better view the trough and frame of the apparatus. It does not show the points of attachment of the flat bar frame with the troughs indicated a one-piece welded type unit.
Figure 13:
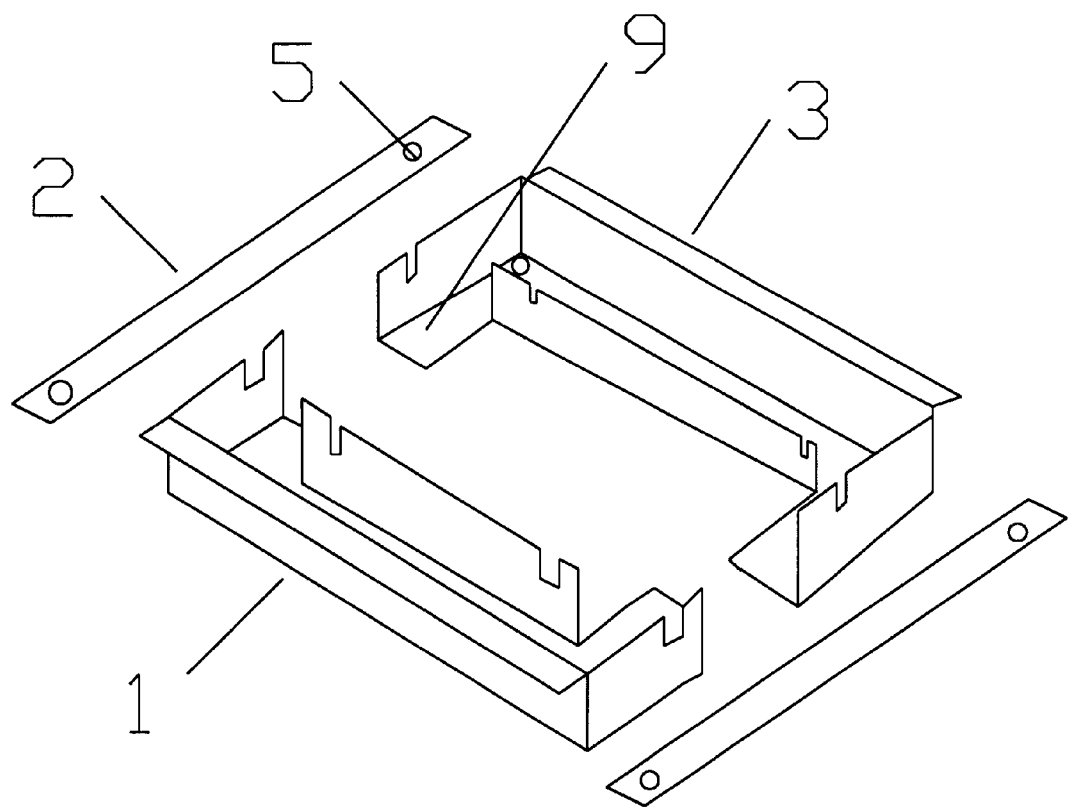
FIG. 13 is a disassembled view of FIG. 12 to help illustrate how the unit is connected together if a bolt together type arrangement is employed instead of a single unit.
Figure 14:
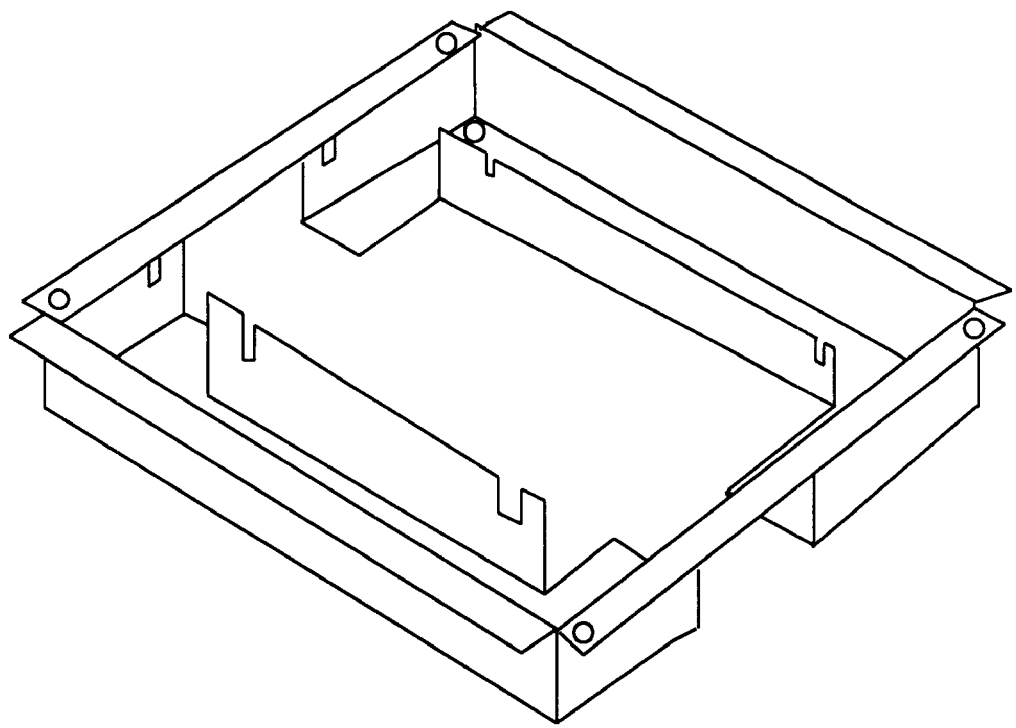
FIG. 14 is an assembled view of FIG. 13.

This invention provides both support and flow diversion devices to regulate flows into a bag for treatment of storm water into a catch basin with a cover. The support and flow diversion device is one or more troughs that employs a lip that acts in cooperation with the catch basin frame to support the trough or troughs by gravity. The apparatus is positioned at or below the elevation of the road surface where it intersects with the catch basin. The trough extends several inches laterally along the peripheral edge of the catch basin and contains openings to discharge water and debris into a sump with the sump preferentially located on the peripheral edge of the catch basin as well. The troughs of this apparatus are flush with the interior wall or frame of the catch basin such that storm water can not pass under the troughs and to optimize capture of storm water. It is envisioned that the current maintenance and garbage collection vehicles used by municipalities could be used in the cleaning and maintenance of this apparatus. The treatment of storm water occurs in the bag or rigid sump where solids are collected through simple sedimentation and filtration by small openings within said bag or sump. The liquid and dissolved contaminants are removed by the absorbent material located within the apparatus.

Hence this invention can be installed into virtually any storm sewer opening having a frame without the need for complicated installation. Selection of the appropriate absorbent material is based upon the storm water of interest. For a storm water contaminant with nitrates, a paper based absorbent may be preferred since paper acts as a nitrogen sink and absorbs nitrates, which is a problem in the Chesapeake Bay area and other parts of the country. Parking lots in areas of little nitrate, which is common in many parts of the country devoid of farmland or yards, would be more compatible with an absorbent material specific to gas and oils. Therefore, the type of absorbent material is independent of the unit, since the unit can hold any absorbent or operate without any absorbent material to collect only solids in the bag(s) or sump(s).

The absorbent can be replaced whenever needed and will remove a significant portion of the liquid and dissolved phase contaminants. Solids can be removed from the unit at regular intervals by dumping or replacement of the sump or bag. The bags or sumps would also contain absorbent material.

What is claimed is:

1. An apparatus for insertion into a storm sewer catch basin, said apparatus comprising:
    a plurality of troughs to direct water and debris entering said catch basin from above said troughs to at least two openings in each said trough and discharging both water and debris out of said openings; and
    said troughs being comprised of a bottom, an outer wall adjacent to the catch basin frame, an inner wall nearer to the center of the catch basin openings and an open top; and
    said bottom of said troughs being so constructed as to resist the flow of water and debris out of said bottom, and
    each said trough is so constructed as to discharge the majority of the water and debris entering each said trough out of openings in the said inner wall of said troughs.

2. The apparatus of claim 1, wherein at least one sump receives water discharging out of said troughs.

3. The apparatus of claim 2, wherein an absorbent material is located in said sump.

4. An apparatus for insertion into a storm sewer catch basin comprising a recessed lip, a cover supported by said recessed lip, and an opening defining an inner peripheral edge, said apparatus comprising:
    a plurality of troughs to direct water and debris entering said catch basin from above said troughs to at least two openings in each said trough and discharging both water and debris out of said openings; and
    each said troughs being comprised of a bottom, an outer wall adjacent to the catch basin frame, an inner wall nearer to the center of the catch basin openings and an open top; and
    said bottom of said troughs being so constructed as to resist the flow of water and debris out of said bottom; and
    each said trough is so constructed as to discharge the majority of the water and debris entering each said trough out of openings in said inner wall into at least one rigid sump, and
    said apparatus containing an absorbent material; and
    said troughs and said rigid sump each occupying a portion of the catch basin opening defining an inner peripheral edge.

5. An apparatus for insertion into a storm sewer catch basin comprising a recessed lip, a cover supported by said recessed lip, and an opening defining an inner peripheral edge, said apparatus comprising:
- a plurality of troughs to direct water and debris entering said catch basin from above said troughs to at least two openings in each said trough and discharging both water and debris out of said openings; and
- each said troughs being comprised of a bottom, an outer wall adjacent to the catch basin frame, an inner wall nearer to the center of the catch basin openings and an open top; and
- said bottom of said troughs being so constructed as to resist the flow of water and debris out of said bottom; and
- each said trough is so constructed as to discharge the majority of the water and debris entering each said trough out or openings in the said inner wall of said troughs into at least one sump, and
- said apparatus containing an absorbent material; and
- said troughs and said sump each occupying a portion of the catch basin opening defining an inner peripheral edge.

* * * * *